United States Patent
Mason et al.

(10) Patent No.: US 6,678,713 B1
(45) Date of Patent: Jan. 13, 2004

(54) MACHINE CONTROL USING A SCHEDULERLOCK CONSTRUCT

(75) Inventors: Raymond I. Mason, Webster, NY (US); Michael D. Dixon, Paolo Alto, NY (US); Thomas G. Beaman, Fairport, NY (US); Robert P. Ferraro, Rochester, NY (US); Robert M. Vanduyn, Rochester, NY (US); James J. Des rivieres, Ottawa (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/069,038

(22) Filed: Apr. 29, 1998

(51) Int. Cl.[7] .................................................. G06F 9/00
(52) U.S. Cl. ......................... 709/102; 709/318; 710/58
(58) Field of Search ................................. 709/102, 318, 709/400, 315, 100–108, 310; 710/5–7, 59, 58

(56) References Cited

U.S. PATENT DOCUMENTS

| | | | |
|---|---|---|---|
| 4,800,521 A | | 1/1989 | Carter et al. ................. 709/102 |
| 4,980,824 A | * | 12/1990 | Tulpule et al. ............... 717/127 |
| 5,012,409 A | * | 4/1991 | Fletcher et al. ............. 709/103 |
| 5,355,484 A | * | 10/1994 | Record et al. ............... 709/106 |
| 5,559,606 A | * | 9/1996 | Webster et al. .............. 358/296 |
| 5,608,908 A | * | 3/1997 | Barghouti et al. ........... 709/318 |
| 5,631,740 A | * | 5/1997 | Webster et al. .............. 358/296 |
| 5,668,942 A | * | 9/1997 | Fromherz .................... 358/1.13 |
| 6,012,081 A | * | 1/2000 | Dorn et al. ................... 709/102 |
| 6,035,343 A | * | 3/2000 | Tsushima et al. ............ 709/318 |
| 6,061,709 A | * | 5/2000 | Bronte ......................... 709/103 |
| 6,138,171 A | * | 10/2000 | Walker ......................... 709/318 |
| 6,292,841 B1 | * | 9/2001 | Mason et al. ................. 709/318 |
| 6,308,197 B1 | * | 10/2001 | Mason et al. ................. 709/102 |
| 6,480,878 B1 | * | 11/2002 | Mason et al. ................. 709/102 |
| 6,549,928 B1 | * | 4/2003 | Mason et al. ................. 709/102 |

* cited by examiner

Primary Examiner—Lewis Bullock, Jr.
(74) Attorney, Agent, or Firm—David E. Henn; Ronald F. Chapuran

(57) ABSTRACT

A method of use of real time machine control software integrating both event based mode and task based components. In particular, a collection of constructs have been created that allow machine control applications to be expressed in event based terms and the event based constructs to be seamlessly integrated with task based constructs. The method includes the use of response time specifications, in particular in conjunction with ReactiveTask and Task constructs. The method also includes the use of Register, ReferenceClock, and SchedulerLock constructs.

8 Claims, 1 Drawing Sheet

MACHINE CONTROL USING A SCHEDULERLOCK CONSTRUCT

FIELD OF THE INVENTION

The present invention relates to a method and apparatus for real time machine control, in particular, to the combination of state machine and task oriented paradigms.

BACKGROUND OF THE INVENTION

Real-time and machine control software has typically been built using sequential tasks with assigned priorities. There are several problems with this approach. There are a number of physical components in an embedded system, which are all operating simultaneously. Having to control these several parallel activities using a sequential model makes the design and development of the control software very difficult. It is especially difficult when the control sequence must also account for unexpected events requiring alternative control flow, such as faults.

Also tasking has high overhead in terms of stack space per task. Task control block designs in operating systems restrict the total number of tasks in the system. This often forces the combination of separate pieces of functionality into one task, and compromises design freedom. This is particularly important in the context of object-oriented software, which encourages the decomposition of the system into a number of small interacting objects.

Also priority specifications are relative to each other. There is no direct relationship between the requirements of the application, and the scheduling priority that must be assigned to its task. Instead, the priority must be derived empirically by examining the behavior of the system as a whole. So applications programmers do not know how to assign priorities to their tasks and priority specifications are not reusable from one system to another.

The performance of tasking is often poor because of context-switching overhead. The timing behavior of priority-based scheduling is difficult to understand intuitively, because it depends on overall system characteristics. These two factors make it difficult to design embedded control software which will meet deadline requirements. This problem is typically addressed by extensive testing to reduce timing faults, though timing faults can still sometimes be observed in the final product. For want of a better approach, this is the way that embedded real-time software is built currently. It would be desirable, therefore, to be able to overcome at least some of the above difficulties in a control system.

In accordance with the present invention, the Machine Control Runtime (MCR) provides a breakthrough in this area, because it uses innovative concepts to simplify the development of machine control software. It does this by taking advantage of application characteristics. The bulk of the functionality in machine control applications consists of monitoring the state of devices, and sending control outputs to devices in timely fashion, with the output values being determined by a combination of the input values, and the current system state. Thus, machine control software primarily implements state machines for each system component. The timing requirements of machine control generally take the form of response time requirements i.e. maximum time that may elapse before an output must be produced in response to an input.

It is the object of the present invention, therefore, to provide state functionality by using special constructs for state machine programming, integrating this event-driven paradigm with the conventional tasking paradigm, and to provide scheduling based on response time specification. Some of the other innovative features of the Machine Control Runtime include object-oriented abstractions of inputs and outputs, reference clocks to enable more flexible expression of timing requirements, and a less error-prone application interface for disabling interrupts.

Other advantages of the present invention will become apparent as the following description proceeds, and the features characterizing the invention will be pointed out with particularity in the claims annexed to and forming a part of this specification.

A typical prior art control, assigned to the assignee of the present invention, is disclosed in U.S. Pat. No. 4,800,521 showing tasks residing in multiple processors. Each of the tasks comprises a block of instructions and is operated on in one of the processors. A plurality of tasks are operated on concurrently by providing start instructions in sequence to consecutive tasks.

SUMMARY OF THE INVENTION

A method of use of real time machine control software integrating both event based mode and task based components. In particular, a collection of constructs have been created that allow machine control applications to be expressed in event based terms and the event based constructs seamlessly integrated with task based constructs. The method includes the use of response time specifications, in particular in conjunction with ReactiveTask and Task constructs. The method also includes the use of Register, ReferenceClock, and SchedulerLock constructs.

For a better understanding of the present invention, reference may be had to the accompany drawings wherein the same reference numerals have been applied to like parts and wherein:

DETAILED DESCRIPTION OF THE INVENTION

Figure 1:
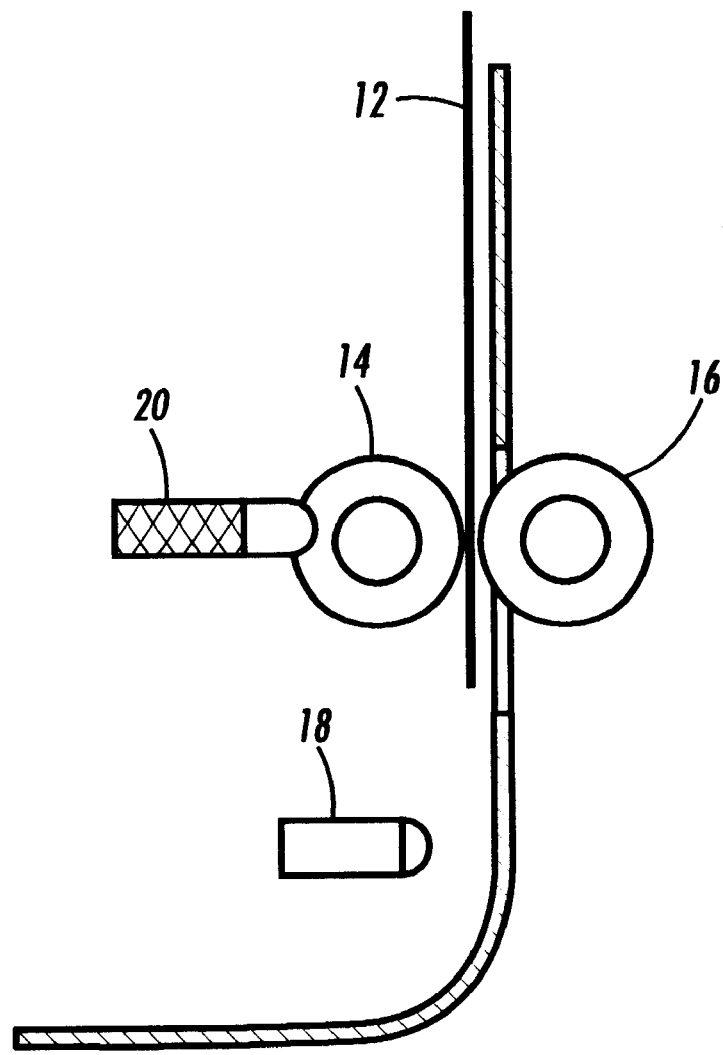
FIG. 1 is an example illustrating the Machine Control Runtime in accordance with the present invention.

Code templates for various Machine Control Runtime constructs illustrate a seamless integration of active and reactive software elements, synchronous and asynchronous software behavior. This integration is illustrated with the following diagram:

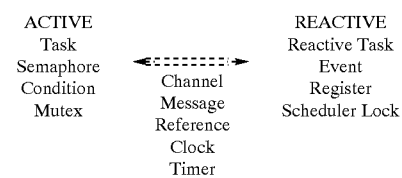

The active side is synchronous with the paradigm that software elements run until they block on some construct for the need of some resource. The reactive side is asynchronous with the state machine paradigm where software elements are invoked when something of interest occurs and perform some relatively quick processing (like changing state) and then end (knowing that they will be re-invoked again).

Tasks (threads), Semaphores, Conditions and Mutexes are as generally understood in the POSIX world. Channels are queues that hold Messages, which are data objects that carry Process( ) member text to perform software execution on the encapsulated data. ReferenceClocks encapsulate "ticks-" from any source that a Timer may be set up to expire on when the number of "ticks" of interest go by. ReactiveTasks are state machines that attach themselves to Events of interest and are invoked when the those events occur. Register is the counterpart of Condition in the reactive side. They encapsulate some resource (typically data) and fire events associated with the data when it reaches some state of interest. The SchedulerLock is the Mutex counterpart in the reactive side. It guarantees that the holder will not be preempted during a particular block of software.

C++ CLASS DEFINITIONS

The following C++ class definitions implement the key components of the Machine Control Runtime.

The Task class is an object oriented representation of a light-weight thread:

```
class Task
{
   public:
      bool Running ();
      virtual void Body ();
      . . .
   protected:
      void Start ();
      Task (Response milliseconds, . . .);
      . . .
   private:
      . . .
};
```

The Body( ) member is where the thread will begin executing when the Start( ) member is called, usually from the constructor after the Task members have been initialized.

The Running( ) member is used to determine if this task was requested to shutdown and should be checked as part of it main loop in Body( )

This version of a semaphore is a counting semaphore:

```
class Semaphore
{
   public:
      void Acquire ();
      void Release ();
      . . .
   private:
      . . .
};
```

Callers will block on Acquire( ) when the count is zero. Each Release( ) will increment the count unless there are tasks blocked on the Acquire( ).

A Boolean Semaphore can be created by calling Release( ) once, thereby allowing the first Acquire( ) to return without blocking.

The following class implements the Mutex construct:

```
class Mutex
{
   public:
      void Lock();
      bool TryLock ();
      void Unlock ();
      . . .
   private:
      . . .
};
```

The following class implements a Condition construct:

```
class Condition
{
   public:
      Condition (Mutex* mutex, . . . )
      void Wait();
      void Broadcast ();
      . . .
   private:
      . . .
};
```

A reference clock (or reference counter) is used to measure the passage of time from an external source. class ReferenceClock

```
{
   public:
      ReferenceClock (Driver* driver, . . . )
      void Expire();
      . . .
};
class Timer
{
   public:
      Timer (ReferenceClock& clock, . . . );
      operator= (TimeAbsolute);
      . . .
};
```

The source can be a milliseconds clock, a seconds clock, a sheet count clock, a motion encoder, etc. The Driver class is the driver of changes to the count.

A Timer expires after the passage of a prescribed amount of time relative to a ReferenceClock. The timer is set or cleared with the assignment operator. Setting to zero cancels the timer.

Events are light-weight objects to indicate that something of interest to someone has occurred:

```
class Event
{
   public:
      void Broadcast ();
      . . .
   private:
      . . .
};
```

Examples of events include a motor turning on, a calculation completes, a sensor changes state, a synchronizing point in time has expired, a leaf hits the ground and so on.

There are two sides to an event: the supply side (detects something of interest and fires the event) and the demand side (attaches to the event and is notified when it fires). The supply side fires the event simply by calling its Broadcast( ) member. The demand side attaches by calling the Attach( ) member of the ReactiveTask class.

The breaking of the supply and demand side results in a high degree of modularity since neither knows about the existence of the other and can be developed totally independently of each other. The same applies for multiple demand side requirements.

There is no need to subclass Event. They can be included and members of other classes.

The abstract call ReactiveTask is for defining event-based state machines:

```
class ReactiveTask
{
    public:
        ReactiveTask (int response, . . . );
        . . .
    protected:
        Attach (Event* event, Enum message);
        Detach (Event* event, Enum message);
        Start ();
        Stop ()
        virtual void HandleMessage (Enum message, . . . );
        . . .
    private:
        . . .
};
```

Concrete ReactiveTasks are state machines that are invoked (HandleMessage called) when events of interest (Attached to) occur. The ReactiveTask Start( ) member synchronizes the Attach/Detach requests to coordinate the reaction from multiple event occurrences.

The response value in the constructor specifies how long in milliseconds this ReactiveTask can be delayed from completing its reaction to any event occurrences that it is attached to. This removes the system coordination of assigning priorities to software elements and allows independent development from other software elements. A response time of zero indicates that the HandleMessage member must be called with no delay (immediately when the event occurs).

ReactiveTasks are light-weight tasks since they do not carry any stack or context switch resource needs. Only the underlying system implementation requires stack resource, which could be shared between hundreds of ReactiveTasks. This is an important system consideration, since embedded software control systems typically have relatively small memory resources.

A Register is a general-purpose abstraction of a resource:

```
class Register
{
    public:
        Register (Device* device, . . . );
        virtual Event* Changed ();
        virtual Event* Updated ();
        . . .
    private:
        . . .
};
```

The intention is that a register is used to maintain the resource and provide the supply side of any events associated with the resource. Registers provide a basis for communication between an open-ended number of software entities that share an interest in the associated resource and its current state.

Registers are internally synchronized and several clients can access a Register simultaneously without having to synchronize their actions.

It is assumed that software elements will create any number of Register types by sub-classing from Register of common types and provide added value such as further events. As an example, one could create an loRegister that exported TurnedOn and TurnedOff members as well.

The SchedulerLock class is used for disabling interrupts while executing a block of code:

```
class SchedulerLock
{
    public:
        SchedulerLock ();
        . . .
    private:
        . . .
};
```

This class is meant to be used by creating a temporary instance within a block of code:

```
{SchedulerLock I;
    TotalSheetsPrinted.Increment();
    PaperTray1.Sheets.decrement();
};
```

While in that block of code, the object guarantees that it will not be preempted. This offers the same synchronizing capability of a Mutex without the need to block.

The automatic constructor call at the beginning of the block initiates the scheduler lock and the automatic destruction at the end of the block removes the scheduler lock. This guarantees a matched set of calls to the scheduler locking mechanism and hides the implementation from software entities.

The Message class encapsulates some data to be sent to another software entity:

```
class Message
{
    public:
        Message ();
        virtual void Process();
        . . .
    private:
        . . . some data . . .
};
```

The Process( ) member allows the sender to specify what is to be done with the data. This ability results in a great deal of software modularity and independent development.

A server task could be created to process unknown data in an manner only known by each Message sub-class.

The Channel class is a queue of Messages that are held in First-In/First-Out order:

```
class Channel
{
    public:
        enum WaitStatus {wait, noWait}
        Channel ( . . . );
        void Send (Message* message);
        Message* Receive (WaitStatus status);
        Event* NewMessage ();
        . . .
    private:
        . . . some data . . .
};
```

This class is used in both the active and reactive operating modes. It is the main communication vehicle between these modes since Tasks cannot attach directly to events.

The Channel is also a good mechanism to safeguard ReactiveTask members by queuing external requests for the HandleMessage member. This is accomplished by attaching to the NewMessage event of the Channel. The NewMessage event is fired each time Send is called with a Message to queue.

Messages are sent to the queue by the method Send and retrieved from the queue with the method Receive. Receive has a status parameter that allows a no wait to be specified if the caller does not wish to block when the queue is empty. The returned Message pointer is null when this occurs.

In accordance with the present invention, the Machine Control Runtime provides the Event and ReactiveTask constructs to enable applications to realize state machines directly in code. The Machine Control Runtime defines a number of Event objects that provide notification of various external occurrences that are of interest to applications. Applications may also create Event objects to provide internal notification of situation and state information to other applications. Anyone who wishes to obtain notification of an Event can attach themselves to the Event object (get themselves put on the notification list for the Event). When the Event occurs, the applications get a callback from the system, letting them know that the Event has occurred.

State machines are implemented by the ReactiveTask construct. A ReactiveTask is an object that responds to Event occurrences. When created, the ReactiveTask is attached to the set of Events that it is interested in. When any of these Events occur, the system performs a callback to the HandleMessage( ) method of the ReactiveTask, with a parameter to indicate the Event whose occurrence triggered the ReactiveTask execution.

The key concept of the ReactiveTask construct is that the HandleMessage( ) is required to execute to completion without blocking i.e. it is not allowed to make any system calls that might require its execution to be suspended. This is an acceptable restriction, because the HandleMessage( ) execution implements a particular transition in the state machine represented by the ReactiveTask. In a state machine, any input causes an immediate transition to a new state, possibly accompanied by an output operation. So machine control software applications do typically demonstrate this execute-to-completion behavior on each state machine transition. It is also possible to reimplement operations that typically require blocking, such as synchronization, timer and input operations, in an alternative manner that uses Event notification of completion of the operation instead of blocking.

Because a ReactiveTask cannot block, it does not need to have an independent execution thread i.e. it need not be implemented as a Task. It also does not need its own stack, since there is no context to be saved between executions (except the state variables contained in the object itself). Instead, we can create one or more system tasks which will execute all ReactiveTasks in turn, waiting for each one to complete before beginning the next. The Machine Control Runtime creates a set of Responder tasks which execute all ReactiveTasks when their Events occur.

Applications can use Events to avoid control coupling between different parts of the system. For example if one part of the system detects a situation which must be handled by a different part, it can simply post an Event, and the consumer can react to and process the Event on its own time. With conventional Tasking, the producer generally makes a procedure call to the consumer, and all the processing performed on the consumer end is done on the producer's time (i.e. in the calling thread). If the consumer code is changed, it may cause the producer to miss its deadlines. Clearly, this kind of control coupling is very undesirable in system design.

Existing technology—Machine control is performed using sequential Tasks that perform all control functions for an entire subsystem. Since the subsystem may contain several individual components, the state machines for all the components must be crunched together into a single control sequence. Also, since the operation of several parallel components must be controlled with a single sequential execution thread, extensive analysis of the state machine behavior must be performed to determine exact sequences of operational behavior. All deviations from expected sequential behavior must be explicitly detected and provided for in the sequential code. Control coupling as described above is a common artifact of Tasking systems.

Event technology has been used extensively in many graphical user interface systems, including the Apple Macintosh operating system. This event technology does also have execute-to-completion semantics, with a system thread performing the execution. However, it has not been extensively used in the machine control domain.

The advantages of the Machine Control Runtime are that ReactiveTasks provide simple, intuitive realizations of state machines. The inputs to the state machine become the Events to which the ReactiveTask is attached. The various states can be represented by variables contained in the ReactiveTask object. The HandleMessage( ) method of the ReactiveTask implements all transitions of the state machine. HandleMessage( ) is typically structured as a set of nested case statements, with each branch of the state machine being one branch of the case statement.

Also, ReactiveTasks reduce stack space requirements. It is possible to provide separate state machine implementations for thousands of system components, without an explosion in system memory requirements. ReactiveTasks improve system performance. Because of the execute-to-completion semantics, there are fewer context switches, and hence less execution time overhead. ReactiveTasks also increase software reuse. ReactiveTasks can be used to implement the behavior of individual system components such as motors, sensors and clutches, whereas Tasks often control entire subsystems such as feeders and markers. Therefore, we can reuse individual ReactiveTask objects in a different product which has a different subsystem design, but based on the same individual components. There is also control decoupling between consumer and producer. With Events, the producer does not even know who the consumer(s) of an Event are. It posts the Event, and anyone interested may attach to it.

Integration of Event model with Tasking model—Typically, operating systems provide either an event-based model or a Task-based model. But machine control software has both kinds of requirements. Most of the control is implemented as state machines using the Event model. However, some activities such as image processing and scheduling may intrinsically involve sequential algorithms, which are best implemented as conventional tasks. The Machine Control Runtime supports Tasks (an object-oriented version of threads in POSIX 1003.4a) in addition to the Event model. Tasks may block during their execution, and are suitable for sequential algorithmic processing.

Tasks also have response times (see below), and compete with ReactiveTasks for scheduling. Each Task has its own stack, and context switching between Tasks requires saving of state information. The I/O and interprocess communication primitives (see below) may be used by Tasks as well as ReactiveTasks. Thus, Tasks share all capabilities of a ReactiveTask except Event notification. Even this may be obtained by adding a co-operating ReactiveTask to forward the Event using a Channel. ReactiveTasks are themselves executed by a Responders which are realized as Tasks. This seamless integration of the two paradigms is a unique feature of the Machine Control Runtime.

Other operating systems generally support either an event-driven model or a tasking model, but do not allow free intermixing of event-driven and sequential control. With the present invention, each application in the system can be realized in the way that is most intuitive for its purpose. Also, sequential algorithmic software written for conventional operating systems can be reused in conjunction with the other Event-driven machine control software. This is important, since it allows one to take advantage of commercial software packages which are typically task-based.

Response time specification—In the Machine Control Runtime, applications specify the desired response time for each task and ReactiveTask. For a ReactiveTask, the response time if the maximum time between the receipt of an input signal and the generation of the control output in response to that input. Once a ReactiveTask is triggered by an event, it must complete execution of its HandleMessage( ) for that Event within the specified response time. For a Task, the response is the maximum time that may elapse after a task becomes ready to execute before it blocks on some system call.

The response time is directly related to the application requirements. The design of the machine control system includes the specification of maximum response times for various activities. Therefore an application programmer knows what response times must be specified for a given ReactiveTask. In contrast, priority specifications are relative to other applications, so an application programmer cannot determine the appropriate priority specification without knowing all about the other tasks in the system.

Response times provide scheduling flexibility. Since they specify semantics rather than a scheduling procedure, the system is free to implement any algorithm that satisfies the response times. ReactiveTasks, for example, may be grouped by response times in any desired fashion, with a Responder Task to execute each group of ReactiveTasks. Thus the system can strike any desired balance between responsiveness and scheduling overhead. Since Tasks also have response times, they can compete with the Responders on a equal basis (e.g. priority-preemptive scheduling using response times as priorities for processing times.

Real-time systems today are primarily priority-oriented. However, response times in accordance with the present invention can be determined easily by programmers from application requirements, instead of by trail-and-error, as is often done with priorities. Also, response time specifications are portable and reusable i.e. there is no need to change the response times of applications if the platform changes, or if the same module is used to provide the same behavior in a different system. The effect of priority specifications varies depending on the hardware platform, and on the other tasks present in the system. Response time specifications provide flexible in scheduling. The operating system may use any scheduling algorithm that meets all the response time specifications. Priority specifications usually imply a particular scheduling mechanism.

Input/Output abstraction—The Machine Control Runtime provides a set of constructs that give a high-level view of device operations to applications, hiding from the details of device interactions. Memory-mapped devices that are directly connected to the processor, and provide interrupts when their state changes, are presented to applications using the Register construct. A Register appears to the application to be a shared data object with built-in synchronization. Any writes to the Register automatically change the state of the device, and any change in the device automatically alters the Register. The Machine Control Runtime associates device drivers with the Register to cause this to happen.

Devices which have a message-passing interface are presented to applications using the Channel construct. This is simply an object-oriented version of message passing constructs in existing operating systems. Non-local devices which do not provide interrupts when their state changes, but whose interface involves reading and writing values rather than exchanging messages, are encapsulated using the RemoteRegister construct. This behaves in the same way as Registers, except that reads and writes take effect only after a delay.

All these device interfaces include built-in Events to notify applications when their value changes. Applications can respond to these Events in the same way they respond to internal Events, and access these object just as they access local data structures. Moreover, all these objects may be used to encapsulate interactions between ReactiveTasks, so there is no need for a fresh set of abstractions.

UNIX and other operating systems provide a common device interface, but it uses the same Open( ), Close( ), Read( ) and Write( ) calls irrespective of whether the device interface involves interrupts or message passing. This necessitates the use of separate interrupt handlers to handle the asynchronous notifications arriving from interrupt-based devices.

The advantages of the Machine Control Runtime are that applications can interact with devices exactly as if they were data objects, without having to know about individual device characteristics. The same constructs can also be used for external input/output as well as interprocess communication, and interrupt handlers are completely hidden from the application.

Reference Clocks—Machine control software has timing requirements which must be met. These requirements may be specified in various ways. They may be specified as particular "Wall-clock time" values, i.e. as a particular date and time-of-way at which some action must take place. Requirements may also be specified in terms of "real-time"values i.e. the value of the (physical or logical) system clock at which the action must take place. In xerographic system, timing may also be specified in units of "machine-clock cycles" i.e. number of encoder pulses within or after which the action must occur. This form of specification is useful in systems with variable-speed drives, where the entire machine (especially paperpath-related components) speed up or slow down as the main drive speed changes. Using machine clock in these systems enables synchronization in the presence of variable delays.

The Machine Control Runtime supports these multiple forms of specification with the ReferenceClock construct. The operating system implementor may define a set of Reference Clocks, which are counters that are incremented periodically. Applications can read these clocks to get absolute "time" values, or create Timer objects based on the appropriate clock to obtain Event notification after a specified relative "time" interval.

This allows applications to define their requirements in terms of any convenient notion of "time" which may be appropriate for their application.

In the prior art, usually operating systems provide only a system clock and/or wall clock, and applications must devise their own interfaces for alternative specification mechanisms. The advantages of the Machine Control Runtime are that applications can specify requirements and perform timing in an intuitive way. Implementations can provide alternative notions of time e.g. synchronized locks in a distributed environment, without changing application code.

Interrupt disabling interface—In Real-time systems, it is necessary to disable interrupts during short sections of code, to obtain synchronization. The Machine Control Runtime provides the SchedulerLock construct to disable interrupts. The constructor of the SchedulerLock class disables interrupts, and the destructor re-enables interrupts. So, to have interrupts disabled in a section of code, an applications programmer can place the code in a C ++ block, and declare an automatic object of class SchedulerLock at the start of the block. This will cause interrupts to be disabled when the block begins execution, and automatically re-enabled when the block completes. This provides a readable, error-free interrupt disabling mechanism.

In the prior art, applications must make explicit calls to disable and to enable interrupts. It is possible to accidentally forget to re-enable interrupts, with disastrous consequences to system operation. This is especially a problem in the case of multiple exit paths (e.g. several return statements) from a block, and with the use of exceptions, when control may pass out of the block without explicit programmer specifications. Therefore, the advantages of the Machine Control Runtime are that it exploits built-in object-oriented programming mechanisms to provide error-free operation. It also interrupts re-enabling gets handled properly under all circumstances, since the compiler takes responsibility for invoking destructors, and using C++ blocks provides visual cue for which code has interrupts disabled.

The overall architecture of the Machine Control Runtime enables applications to be structured as state machines with response times derived from the requirements. The inputs to the state machines are Events. Applications interact with each other and with devices through various kinds of interface objects, which abstract out any hardware dependencies. Timing behavior is controlled by Reference Clocks and Timers, which provide logical notions of the passage of time. Applications may be designed as any cooperative combination of Tasks and ReactiveTasks. All Machine Control Runtime constructs are implemented as objects and have a fully object-oriented interface. The semantics of all operations are expressed at a higher conceptual level, without direct reference to and dependence on hardware and platform characteristics.

This is a major change from the existing machine control software technology, where applications interface directly with device drivers and interrupt handlers, where timing and scheduling are often ad hoc, and both the design and implementation are very specific to the hardware and software platform. It is very difficult to reuse software from one project to another, because of platform characteristics, and the large monolithic Tasks which embed hardcoded knowledge of several parts of the system.

This architecture itself has several advantages, in addition to those listed for the individual constructs. Applications are independent of the underlying operating system, since they interact only with the Machine Control Runtime which can be ported to a different operating system. The object-oriented applications interact with the Machine Control Runtime using object-oriented constructs instead of the procedural constructs supported by traditional operating systems. Response times are composable, in that different applications written by different people can automatically be used together; this is not possible with priorities. Applications are also independent of the hardware, because of the abstractions provided in the Machine Control Runtime. finally, because there are no restrictions on the number of ReactiveTasks, it is possible to design systems in the spirit of the object-oriented methodology, with many small, independent, autonomous objects. All this makes it possible to build applications more easily, and create software that is reusable across product programs. This is not achievable with the existing technology.

FIG. 1 is an example of a typical real-time machine control application illustrating a sheet of paper 12 traveling downward through a mechanical paper path assembly. The drive rolls 14, 16 control the speed of the sheet at the current instance. The sensor 18 detects the presents of paper by light reflectance. The encoder 20 detects pulses indicating positional movement of the drive rolls 14, 16 and therefore positional motion of the sheet of paper. This diagram is a simplified version of actual mechanical/electrical hardware for illustrative purposes only.

The software requirements for this assembly are to check that the paper arrives at the sensor some number of milliseconds or encoder pulses from the last sensor (not shown in FIG. 1) and to monitor the number of encoder pulses per millisecond and range check it. The software also performs some data analysis when the sheet has arrived at the sensor, counts the number of sheets to pass by the sensor and notify other software tasks when the count reaches values of interest to the other tasks, and when the paper count reaches a predefined number starts some background data processing.

For the sake of illustration, assume that checking the paper requires notification of the sensor within 10 milliseconds, monitoring the encoder pulses requires immediate time stamping of both encoder value and millisecond clock value simultaneously but that the range detection only need be done within 50 milliseconds, the data analysis is not critical and need not be completed for over 1 second from the sheet arrival, the count detection needs to be updated within 100 milliseconds of sheet arrival, and the background processing need not be completed for over 1 second from the sheet arrival.

The following class definitions are used to implement the example requirements and illustrate the use of the invention C++ class definitions. These class definitions are generic to every application software person with requirements that needed timers (sheet, real-time, machine clock) and IO constructs.

The following class implements digital sensors:

```
class Sensor : public Register
{
    public:
        Sensor (IoDriver* driver, . . . );
        Event* PaperPresent ();
        Event* NoPaperPresent ();
        . . .
    private:
        . . .
};
```

Each device passes its unique specification in the constructor so those users of instantiations need not have knowledge of device dependent information. The driver is implemented as a generic class as well but is beyond the scope of this example. Basic operation is that the driver notifies the Sensor when a change of state occurs (detected by hardware interrupt or software simulation) and the Sensor broadcasts the appropriate event whether the internal state has changed to paper present or no paper present.

Requirement (1) could be implemented using a generic class that races time against an event. The definition of the EventTimeRace class could be as follows:

```
class EventTimeRace : public ReactiveTask
{
  public:
    EventTimeRace (ReferenceClock *clock, Duration response,
. . . );
    Enum RaceResults {timerFirst, eventFirst};
    void StartRace (TimeAbsolute deadline, Event *raceEvent,
Event *raceComplete);
        virtual void HandleMessage (Enum message, . . . );
        RaceResults GetResults () {return raceResults;}
        . . .
    private:
        RaceResults raceResults;
        Event *race Event, *raceComplete;
        Timer timer;
};
```

This class is constructed with a clock to time against and a response duration. The response specifies the maximum time this ReactiveTask can be delayed from reacting to its attached events. The StartRace method begins the race between the raceEvent and the deadline time. The race completion is broadcast to anyone interested with the raceComplete event. The raceResults variable keeps the results of the last race completion. Although the example specifies racing a sensor transition with time, the event paradigm is much more flexible and hence more reusable then specifying IO in an interface. The implementations of these class methods are as follows:

```
EventTimeRace::EventTimeRace (ReferenceClock *clock,
Duration response, . . . )
    : timer(clock), ReactiveTask (duration, . . . )
{
    Attach (timer.Expired (), timerFirst);
}
EventTimeRace::StartRace (TimeAbsolute deadline, Event
*race, Event *done)
{
    SchedulerLock lock;
    raceEvent = race, doneEvent = done;
    timer = deadline;
    Attach (raceEvent, eventFirst);
    Start ();
}
EventTimeRace::HandleMessage (Enum message, . . . )
{
    raceResults = message;
    timer = 0;
    Stop ();
    Detach (raceEvent);
    RaceDone->Broadcast ();
}
```

The constructor creates the timer and is permanently attached to its expired event (which is broadcast whenever the programmed time resolves). The StartRace method gets the race activated. It is passed a time value, the event to race against and the event to broadcast when the race completes. The events are stored for later use, the timer is started (which starts the race), the raceEvent is attached to and the ReactiveRask is started. Note that the SchedulerLock is held during this whole sequence to synchronize the timer start with the event attach and start of the ReactiveTask. This provides safety from being interrupted or pre-empted before either the timer or the event can be started.

The instantiation and usage of the classes can be illustrated in the following code in some routine or routines not detailed here:

```
    . . .
    Sensor *sensor = new Sensor (someIoDriver, . . . unique sensor
data);
        EventTimeRace *jamDetector = new EventTimeRace
(realtimeClock, 10, . . . )
        TimeAbsolute deadline = *realtimeClock + someDeltaTime;
        JamDetector->StartRace (deadline, sensor->PaperPresent(),
. . . );
    . . .
```

Note that the jamDectector response is set to 10 milliseconds as per the real-time requirements of (1). Also note that this same detector can be used to detect the trail edge of the paper by calling StartRace with sensor→NotPresent( ) when the paper is detected.

The second example requirement is met by also using the Register and ReactiveTask constructs. A MonitorRegister subclass of Register is defined to record and notify anyone interested in ongoing results of the encoder tick monitoring being performed by a MonitorTicks subclass of ReactiveTask. The following is the class definition of the MonitorRegister:

```
class MonitorRegister : public Register
{
    public:
        MonitorRegister ( . . . );
        void SetRange (TimeRelative min, TimeRelative max)
{minTicks = min; maxTicks = max;}
        Event* TooSlow();
        Event* TooFast();
        void RecordTicks (TimeRelative ticks);
        . . .
    private:
        TimeRelative minTicks, maxTicks;
        . . .
};
```

The SetRange method records the allowable range of ticks as recorded in the RecordTicks method invocation. The two events are exported for anyone interested when the number of ticks is too slow or too fast. The RecordTicks method implementation is as follows:

```
MonitorRegister::RecordTicks (TimeRelative ticks)
{
    if (ticks < minTicks)
        tooSlow->Broadcast ();
    else if (ticks > maxTicks)
        tooFast->Broadcast ();
}
```

The following class defines the invoker of the RecordTicks method, which is performed at a frequency in milliseconds as specified:

```
class MonitorTicks : public ReactiveTask
{
    public:
        MonitorTicks (ReferenceClock *encoder, MonitorRegister
register, Duration response, . . . );
        void StartMonitor (TimeRelative frequency);
        void StopMonitor () { Stop(); }
        virtual void HandleMessage (Enum message, . . . );
        . . .
    private:
        ReferenceClock *encoder;
        Timer millisecondTimer;
        TimeRelative frequency;
        TimeAbsolute lastEncoderRead;
        . . .
};
```

The constructor is passed in the encoder to timestamp and the monitor register to invoke when the timestamp is taken. It is implemented as follows:

```
MonitorTicks:: MonitorTicks (ReferenceClock *en,
MonitorRegister* reg, Duration resp, . . . )
    : encoder(en), msecTimer(realtimeClock, . . . ), register(reg),
ReactiveTask (resp, . . . )
    {
        Attach (msecTimer.Expired);
    }
```

The StartMonitor method starts a timer to expire after the number of milliseconds specified in frequency. This time is continually restarted at this frequency. A time stamp of the current encoder value is initialized in the lastEncoderRead variable.

```
void MonitorTicks::StartMonitor (TimeRelative freq)
{
    frequency = freq;
    lastEncoderRead = *encoder;
    msecTimer = frequency;
    Start ();
}
```

The HandleMessage method is called when the attached millisecond timer expires. This method simply timestamps the encoder ReferenceClock and then invokes the MonitorRegister with the number of ticks since the last expiration. The local variable lastEncoderRead is then updated and the millisecond timer restarted at the specified frequency.

```
void MonitorTicks::HandleMessage (Enum, . . . )
{
    TimeAbsolute encoderRead = *encoder;
    register->RecordTicks (lastEncoderRead - encoderRead);
    lastEncoderRead = encoderRead;
    msecTimer = frequency;
}
```

Requirements (3) and (5) demonstrate the seamless integration of synchronous and asynchronous software behavior. The following Task subclass handles the synchronous processing of data in background at a response of 1-second (1000 milliseconds). It can be defined by the following class definition:

```
class BackgroundTask: public Task
{
    public:
        BackgroundTask ( . . . ): ReactiveTask(1000, . . . ),
channel(. . . ) { Start(); }
        virtual void Body();
        void Send (Message* message) { channel.Send (message); }
        . . .
    private:
        Channel channel;
        . . .
};
```

Asynchronous software elements can pass off synchronous activities to this task by calling its Send method with a message. The Body of this task executes the message as follows:

```
BackgroundTask::Body ()
{
    Message* message;
    while (Running())
    {
        message = channel.Receive ();
        message->Process ();
        delete message;
    }
}
```

The messages being passed would define the work to be done in the virtual Process methods. For example, the follow class defines the implementation of requirements (3) and (5) if created from the ReactiveTask subclasses attached to the asynchronous events that determined when the processing should commence or when the data is available:

```
class SheetArrivalMessage : public Message
{
  public:
    SheetArrivalMessage (Sensor* sensor, ... );
    virtual void Process ();
    ...
  private:
    ...
};
```

Requirement (4) and (5) further illustrate the power of the ReferenceClock construct. Instead of a hardware driver pushing the ticks, a sheet count ReferenceClock could be defined that gets incremented by a ReactiveTask that is attached to a paper present event at the appropriate sensor (much like in the first requirement implementation). Then software elements could create Timers that expire on sheet counts just as they do for other clocks driven by hardware.

While this invention has been described in conjunction with a specific apparatus, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. In an electronic image processing apparatus comprising a controller and a plurality of modules with devices having input and output functions for creating image impressions, the controller including a plurality of constructs including ReactiveTask for responding to external events, Events representing defined abstractions of physical and logical events, NonReactiveTask providing threads of execution, Registers for providing a common resource for ReactiveTasks, and SchedulerLocks for facilitating synchronization and shared data access control, a method of control comprising the steps of:

invoking multiple ReactiveTask constructs in response to an event and attaching the ReactiveTask to all associated Events, providing data in a Register construct capturing a common state requiring access by multiple ReactiveTask constructs, the Register construct providing access protection, and inhibiting the preemption of currently executing tasks by the SchedulerLock construct to facilitate synchronization.

2. The method of claim 1 wherein the SchedulerLock construct including a constructor for disabling interrupts and a destructor for ending the disabling of interrupts.

3. The method of claim 1 wherein if multiple SchedulerLock objects are in existence, the step of enabling interrupts upon the completion of all said multiple SchedulerLock objects.

4. The method of claim 1 the step of automatically destroying a SchedulerLock construct upon completion of a scope of a block in which the SchedulerLock construct was created.

5. In an electronic image processing apparatus comprising a controller and a plurality of modules with devices having input and output functions for creating image impressions, the controller providing interrupts, a method of shared data access control comprising the steps of:

providing a short term interrupt disable for completion of specific tasks, monitoring the completions of said specific tasks, and responding to the completions of said specific tasks, to immediately re-enable the interrupts.

6. The method of claim 5 wherein for multiple tasks requiring a short term interrupt disable, the step of enabling interrupts upon the completion of all said multiple tasks.

7. The method of claim 5 including the step of automatically destroying a SchedulerLock construct when a scope of a block in which the SchedulerLock construct was created exits.

8. The method of claim 5 wherein the short term interrupt disable is a control construct.

* * * * *